US012702262B2

(12) United States Patent
Baboolal et al.

(10) Patent No.: US 12,702,262 B2
(45) Date of Patent: Aug. 11, 2026

(54) SYSTEM AND METHOD OF A SEMI-AUTONOMOUS CLEANING APPARATUS WITH ADJUSTABLE CLEANING PARAMETERS

(71) Applicant: Avidbots Corp, Kitchener (CA)

(72) Inventors: Ravi Baboolal, Kitchener (CA); Duncan Chapman Mclennan, Kitchener (CA); Pablo Roberto Molina Cabrera, Waterloo (CA); Nathaniel Holmes, Kitchener (CA); Natassia Lunzmann, Kitchener (CA)

(73) Assignee: AVIDBOTS CORP

(*) Notice: Subject to any disclaimer, the term of this patent is extended or adjusted under 35 U.S.C. 154(b) by 49 days.

(21) Appl. No.: 18/678,238

(22) Filed: May 30, 2024

(65) Prior Publication Data

US 2024/0398193 A1 Dec. 5, 2024

Related U.S. Application Data

(60) Provisional application No. 63/505,042, filed on May 30, 2023.

(51) Int. Cl.
*A47L 11/40* (2006.01)
*A47L 9/28* (2006.01)
(Continued)

(52) U.S. Cl.
CPC ......... *A47L 11/4011* (2013.01); *A47L 9/2826* (2013.01); *A47L 9/2847* (2013.01);
(Continued)

(58) Field of Classification Search
CPC .. A47L 11/4011; A47L 9/2826; A47L 9/2847; A47L 11/4036; A47L 2201/06;
(Continued)

(56) References Cited

U.S. PATENT DOCUMENTS

2018/0125003 A1 5/2018 Wu et al.
2021/0022578 A1 1/2021 Koebrick
(Continued)

FOREIGN PATENT DOCUMENTS

WO 2017031365 A1 2/2017

OTHER PUBLICATIONS

GB Written Opinion of from IPO for GB2407681.2 dated Nov. 19, 2024.
(Continued)

*Primary Examiner* — Tinsae B Ayalew

(57) ABSTRACT

A system and method of a semi-autonomous cleaning apparatus with adjustable cleaning parameters. A floor cleaning system of a semi-autonomous cleaning apparatus adapts the cleaning parameters by way of one or more control systems in order to optimize cleaning performance in the specific context and application of operation. Using sensors, the front or rear sensing modules of the semi-autonomous cleaning apparatus can detect different floor types and adjust the parameters accordingly prior to initiating a cleaning or polishing plan for regular floors and VCT floor finishes. Floor shininess can also be detected by measuring the reflection of a light source (i.e., LED strip) by a camera sensor. Machine learning algorithms can be used to enable floor cleaning or floor polishing.

8 Claims, 10 Drawing Sheets

(51) Int. Cl.
*G05D 1/648* (2024.01)
*G05D 105/10* (2024.01)
*G05D 107/40* (2024.01)

(52) U.S. Cl.
CPC ........ *A47L 11/4036* (2013.01); *G05D 1/6485* (2024.01); *A47L 2201/06* (2013.01); *G05D 2105/10* (2024.01); *G05D 2107/40* (2024.01)

(58) Field of Classification Search
CPC ............. G05D 1/6485; G05D 2107/40; G05D 2105/10
USPC ........................................................ 134/56 R
See application file for complete search history.

(56) References Cited

U.S. PATENT DOCUMENTS

| | | | |
|---|---|---|---|
| 2021/0022579 | A1 | 1/2021 | Santini |
| 2022/0265110 | A1 | 8/2022 | Molina Cabrera et al. |

OTHER PUBLICATIONS

AU Written Opinion of from IIP Australia for AU2024203641 dated May 30, 2025.

SYSTEM AND METHOD OF A SEMI-AUTONOMOUS CLEANING APPARATUS WITH ADJUSTABLE CLEANING PARAMETERS

CROSS REFERENCE TO RELATED APPLICATIONS

This application claims priority to and the benefit of U.S. Provisional Patent Application Ser. No. 63/305,042, entitled "SYSTEM AND METHOD OF A SEMI-AUTONOMOUS CLEANING APPARATUS WITH ADJUSTABLE CLEANING PARAMETERS" filed on May 30, 2023, the disclosure of which is incorporated herein by reference in its entirety.

BACKGROUND

The embodiments described herein relate to autonomous and semi-autonomous cleaning devices and more particularly, to a system and method for improved cleaning of indoor surfaces.

The use of autonomous and semi-autonomous cleaning devices configured to perform a set of tasks is known. For example, semi-autonomous devices or robots can be used to clean indoor surfaces such as department stores, shopping malls, airports and office buildings.

Most auto-scrubber cleaning systems or semi-autonomous cleaning devices are considered dumb or lacking in intelligence. While they operate in a wide variety of environments and under a wide range of circumstances, they fail to adapt adequately to changing circumstances in order to optimize and maximize cleaning performance.

Vinyl composite tile (VCT) flooring is a versatile, durable floor type used extensively in commercial retail spaces. VCT flooring is most commonly available in 0.125 inch thick, 12 inch square tiles, and is glued to a concrete sub-floor. After installation, a finish is applied to the VCT to improve the appearance of the floor and protect the tile. This floor finish can be polished or "burnished" to a high gloss finish.

Different businesses have different expectations and standards for the maintenance and appearance of the floor finish on VCT floors. Businesses that wish to convey a sense of cleanliness and orderliness may choose to polish their floors multiple times per week to maintain a shiny and glossy appearance. However, polishing floors is time consuming and expensive, and in some cases requires the use of large propane burnishers that require special safety precautions for use, meaning businesses must carefully weigh the costs and benefits of any floor polishing routine.

A small form factor automated burnishing platform could bring value to customers by simultaneously reducing their labour costs and improving the appearance of their floors by polishing more frequently. While it is uncertain whether such a platform could replace large dedicated propane or battery powered burnishing machines, such a device may be able to significantly extend the time between intensive burnishing operations by doing frequent, light, burnishing upkeep.

There is a desire to provide a semi-autonomous cleaning device with adjustable configurations to adequately adjust to changing cleaning scenarios. There is a further desire to use a modified semi-autonomous cleaning device as a floor polishing machine for VCT floor finishes.

SUMMARY

A system and method of a semi-autonomous cleaning apparatus with adjustable cleaning parameters. A floor cleaning system of a semi-autonomous cleaning apparatus adapts the cleaning parameters by way of one or more control systems in order to optimize cleaning performance in the specific context and application of operation. Using sensors, the front or rear sensing modules of the semi-autonomous cleaning apparatus can detect different floor types and adjust the parameters accordingly prior to initiating a cleaning or polishing plan for regular floors and VCT floor finishes. Floor shininess can also be detected by measuring the reflection of a light source (i.e., LED strip) by a camera sensor. Machine learning algorithms can be used to enable floor cleaning or floor polishing.

DETAILED DESCRIPTION

Figure 1:
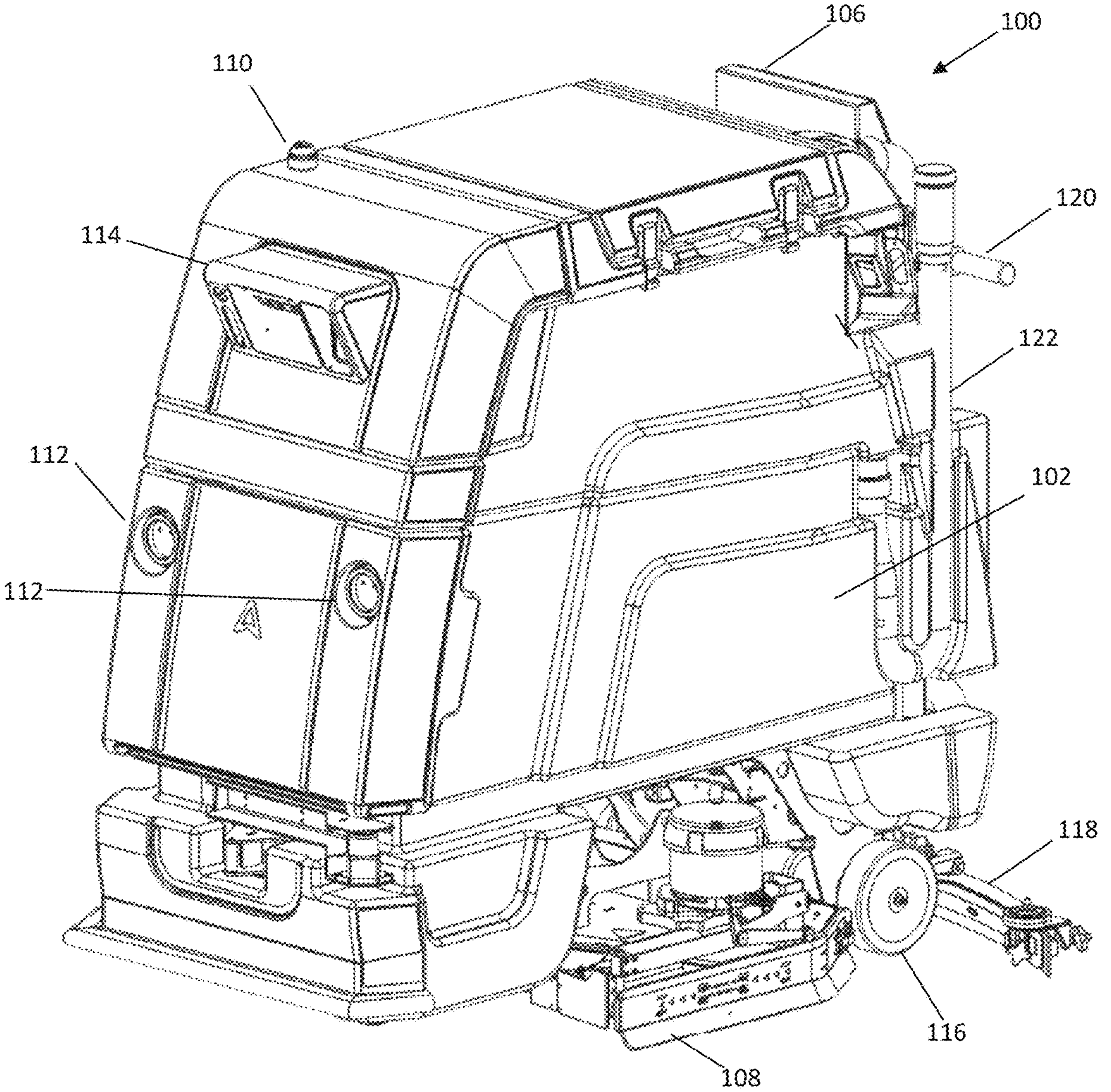
FIG. 1 is a perspective view of a semi-autonomous cleaning device.
Figure 2:
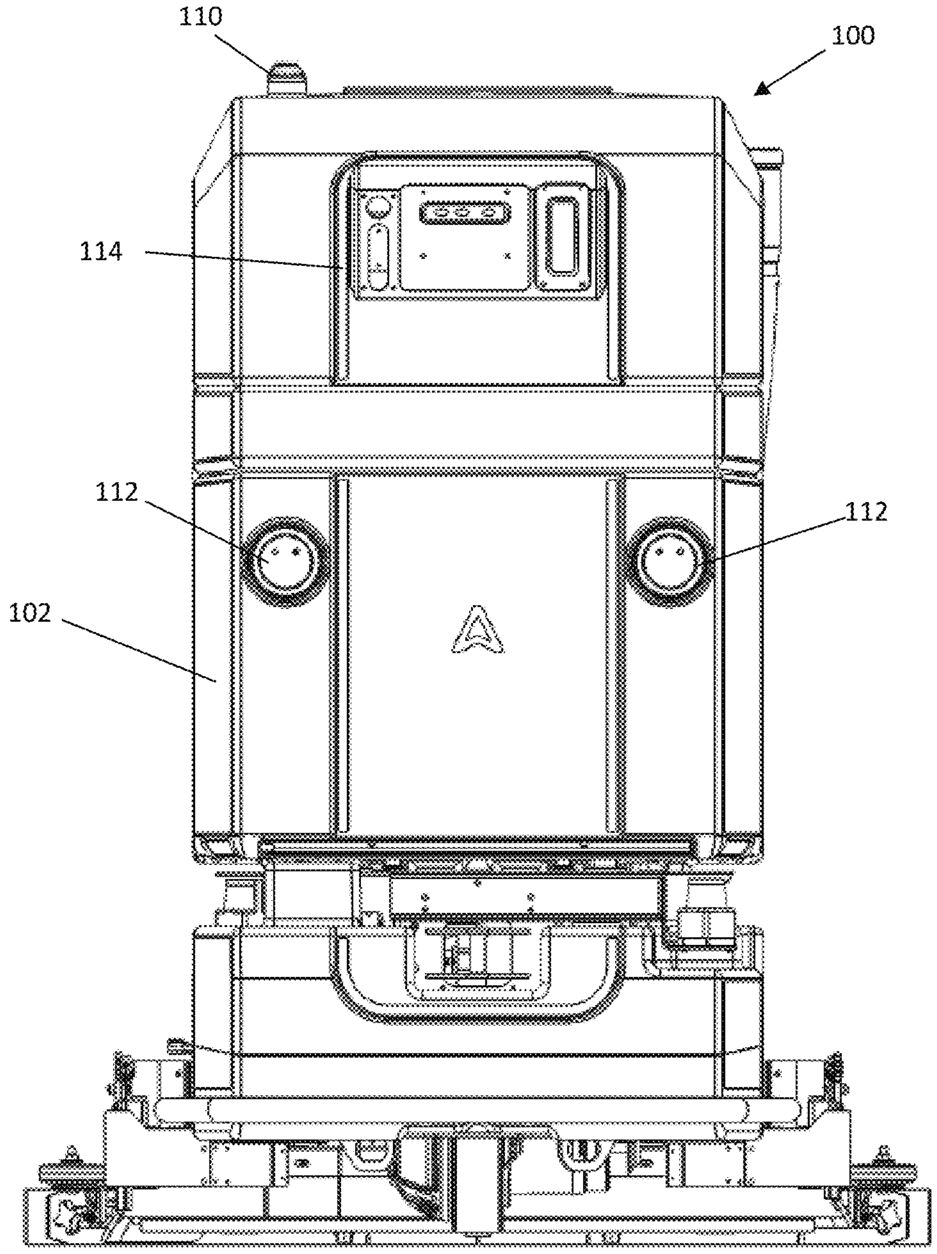
FIG. 2 is a front view of a semi-autonomous cleaning device.
Figure 3:
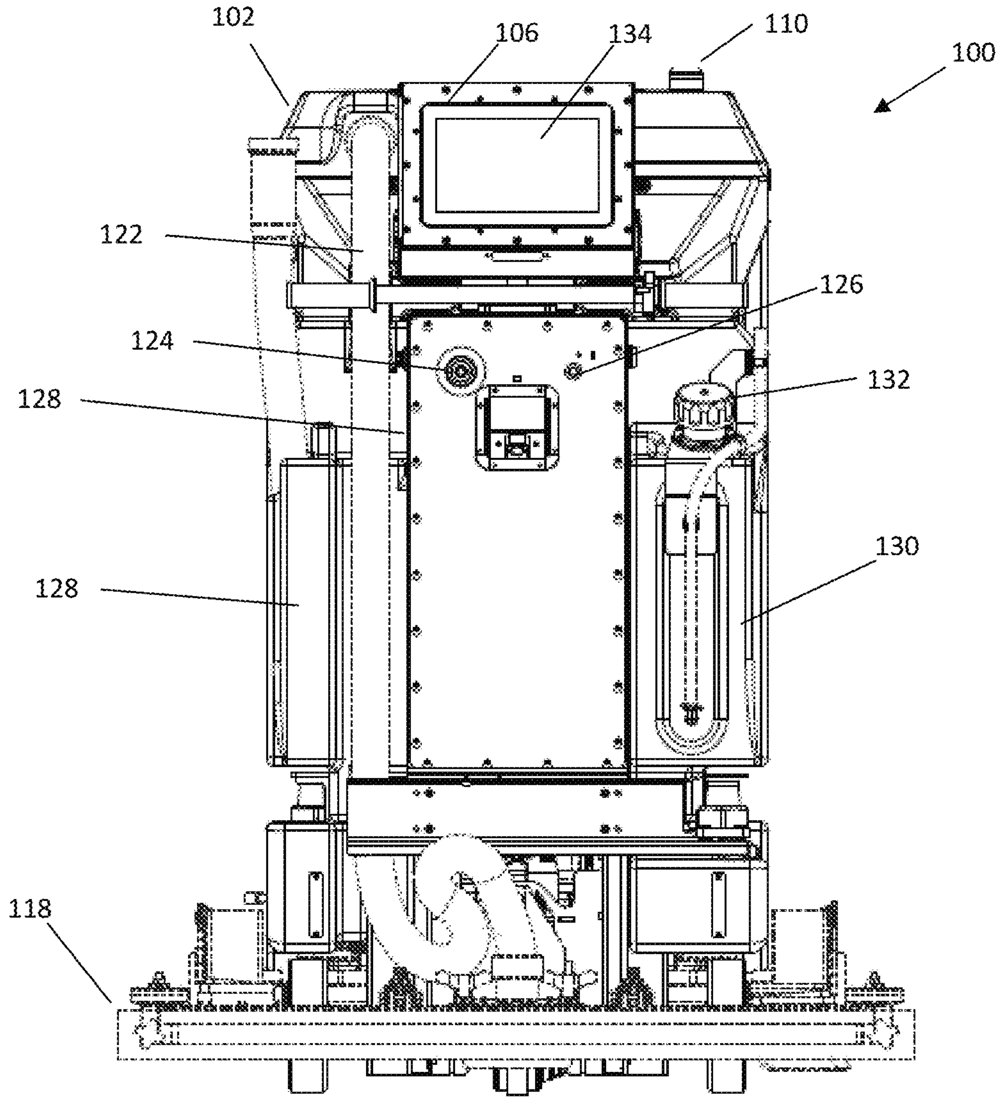
FIG. 3 is a back view of a semi-autonomous cleaning device.
Figure 4:
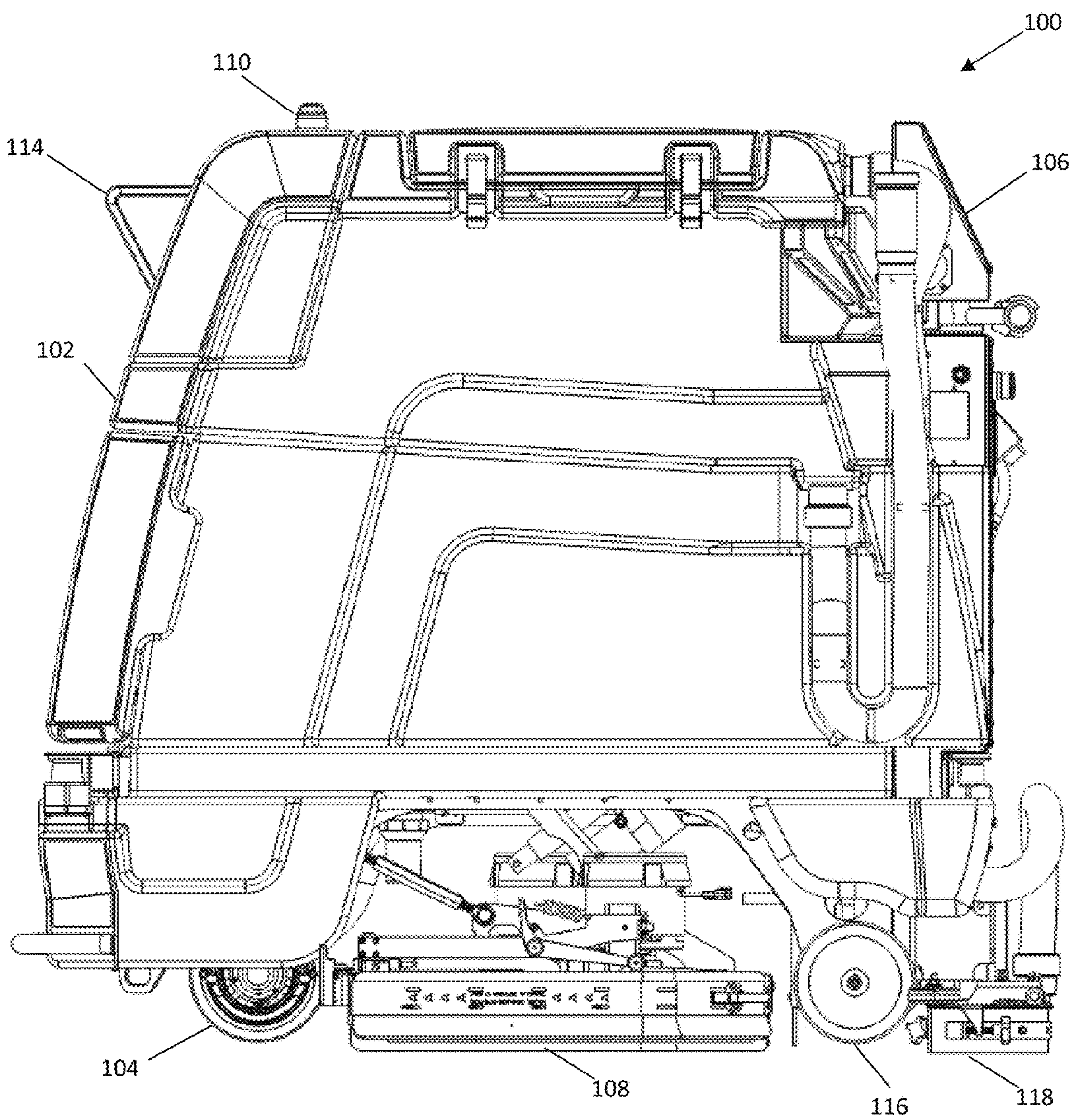
FIG. 4 is a left-side view of a semi-autonomous cleaning device.
Figure 5:
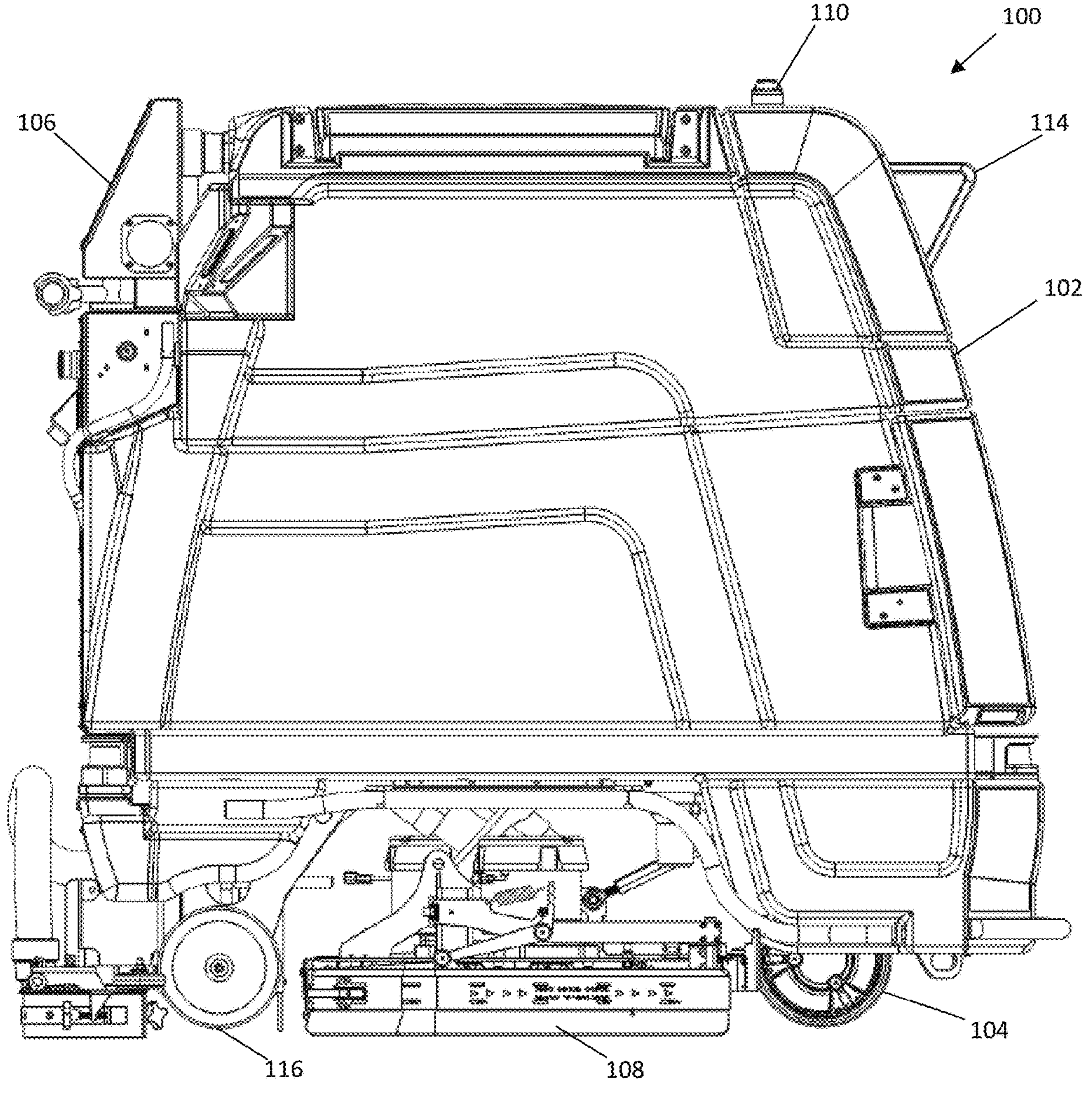
FIG. 5 is a right-side view of a semi-autonomous cleaning device.

An exemplary embodiment of an autonomous or semi-autonomous cleaning device is shown in FIGS. 1-5. FIG. 1 is a perspective view of a semi-autonomous cleaning device. FIG. 2 is a front view of a semi-autonomous cleaning device. FIG. 3 is a back view of a semi-autonomous cleaning device. FIG. 4 is a left side view of a semi-autonomous cleaning device, and FIG. 5 is a right-side view of a semi-autonomous cleaning device.

FIGS. 1 to 5 illustrate a semi-autonomous cleaning device 100. The device 100 (also referred to herein as "cleaning robot" or "robot") includes at least a frame 102, a drive system 104, an electronics system 106, and a cleaning assembly 108. The cleaning robot 100 can be used to clean (e.g., vacuum, scrub, disinfect, etc.) any suitable surface area such as, for example, a floor of a home, commercial building, warehouse, etc. The robot 100 can be any suitable shape, size, or configuration and can include one or more systems, mechanisms, assemblies, or subassemblies that can perform any suitable function associated with, for example, traveling along a surface, mapping a surface, cleaning a surface, and/or the like.

The frame 102 of cleaning device 100 can be any suitable shape, size, and/or configuration. For example, in some embodiments, the frame 102 can include a set of components or the like, which are coupled to form a support structure configured to support the drive system 104, the cleaning assembly 108, and the electronic system 106. The cleaning assembly 108 may be connected directly to frame 102 or an alternate suitable support structure or sub-frame (not shown). The frame 102 of cleaning device 100 further comprises a strobe light 110, front lights 112, a front sensing module 114 and a rear sensing module 128, rear wheels 116, rear skirt or squeegee 118, an optional handle 120 and cleaning hose 122. The frame 102 also includes one or more internal storage tanks or storing volumes for storing water, disinfecting solutions (i.e., bleach, soap, cleaning liquid, etc.), debris (dirt), and dirty water. More information on the cleaning device 100 is further disclosed in U.S. utility patent application Ser. No. 17/650,678, entitled "APPARATUS AND METHODS FOR SEMI-AUTONOMOUS CLEANING OF SURFACES" filed on Feb. 11, 2022, the disclosure which is incorporated herein by reference in its entirety.

More particularly, in this embodiment, the front sensing module 114 further includes structured light sensors in a vertical and horizontal mounting position, one or more sensors (e.g., an active stereo sensor) and a RGB camera. The rear sensing module 128, as seen in FIG. 3, consists of a rear optical camera. In further embodiments, front and rear sensing modules 114 and 128 may also include other sensors including one or more optical cameras, thermal cameras, LiDAR (Light Detection and Ranging), structured light sensors, active stereo sensors (for 3D) and RGB cameras or optical cameras.

The back view of a semi-autonomous cleaning device 100, as seen in FIG. 3, further shows a frame 102, cleaning hose 122, clean water tank 130, clean water fill port 132, rear skirt 118, strobe light 110 and electronic system 106. Electronic system 106 further comprises display 134 which can be either a static display or touchscreen display. Rear skirt 118 consists of a squeegee head or rubber blade that engages the floor surface along which the cleaning device 100 travels.

FIG. 3 further depicts an emergency stop button 124, a device power switch button 126 and a rear sensing module 128. Rear sensing module 128 comprises an optical camera that is positioned to view the area behind device 100. This complements the front sensing module 114 that provides a view in front of device 100. The two sensing modules work together to sense obstacles and obstructions.

In typical floor maintenance machinery, a number of parameters impact how the machinery performs in a given application. For example, a typical floor scrubber has the following controls which impact cleaning performance:

cleaning head pressure cleaning solution flow rate cleaning solution chemical makeup Between floor scrubber models, the following parameters also change:

Floor pad/brush Revolutions Per Minute (RPM) using brushed or brushless motors (typically 75-300 RPM)

Vacuum system suction pressure

Vacuum system flow rate

Across different types of floor cleaning or floor care equipment, the variables vary more widely:

Floor pad RPM (scrubber=175 RPM, burnisher=1,700 RPM)

A cleaning system that can control many of these variables simultaneously to optimize cleaning performance in a specific application is disclosed. For example, if testing shows that Vinyl Composite Tile (VCT) floors achieve the highest post-scrubbing gloss performance with moderate solution flow, high pad RPM, moderate downforce, and low vacuum suction, the proposed system would implement that optimized combination of settings on that specific floor material.

Additionally, such a system could serve as a "2-in-1" machine, replacing both a floor scrubber and a floor burnisher by altering the cleaning system parameters when burnishing pads have been installed (e.g. no water, extremely high pad RPM, very light downforce, vacuum system disabled). In further embodiments, the machine can be used as a burnisher by increasing the angular velocity of the pads.

According to the disclosure, the correct combination of settings could be chosen via multiple means:

1. Manual selection by operator
2. Pre-programmed selection

Figure 6:
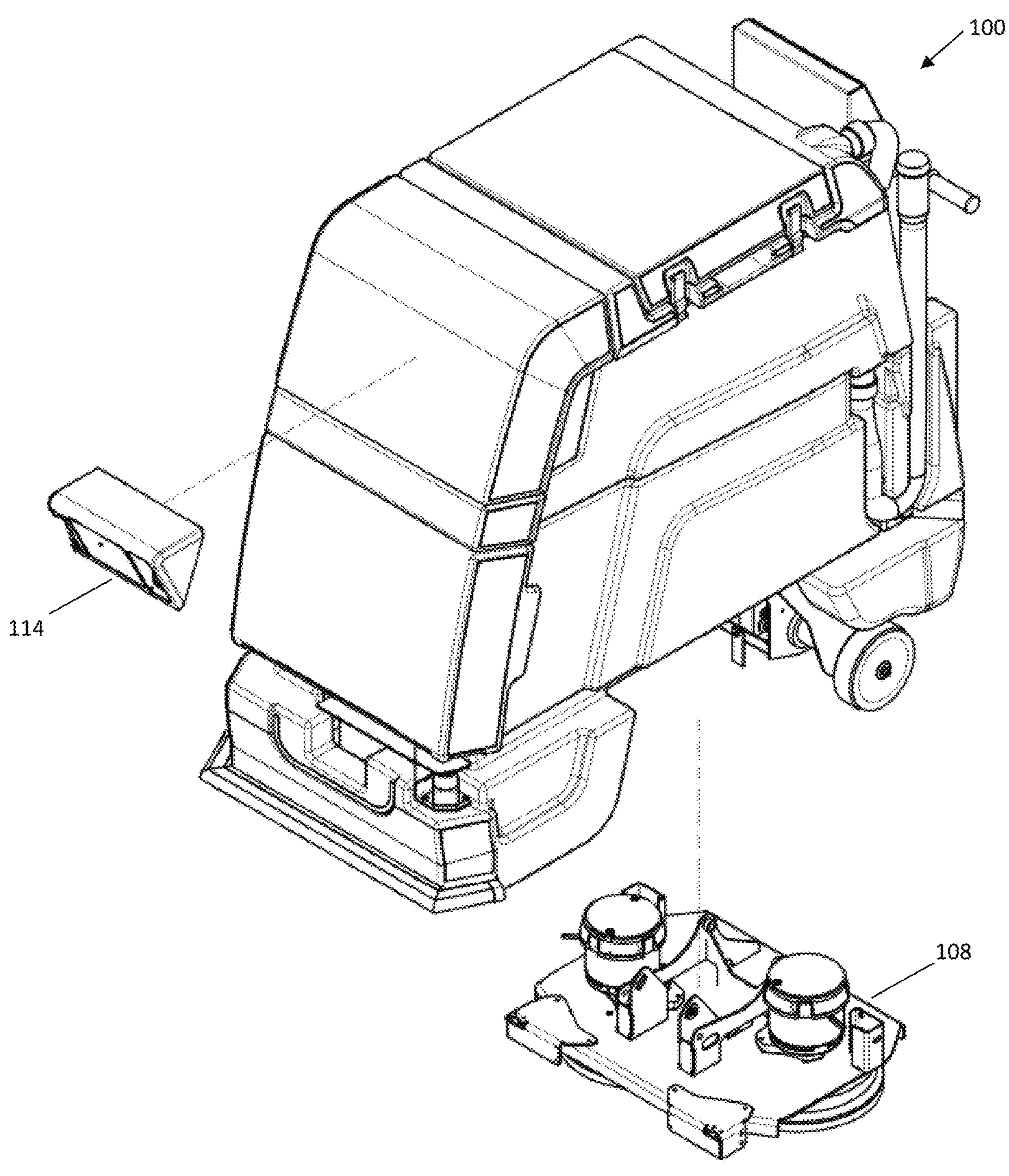
FIG. 6 is a diagram illustrating an exploded view of the semi-autonomous device.

FIG. 6 is a diagram illustrating an exploded view of the semi-autonomous device. According to FIG. 6, semi-autonomous device 100 further comprises a front sensing module 114 and a cleaning assembly module 108 with swappable or replaceable cleaning pads.

Figure 7:
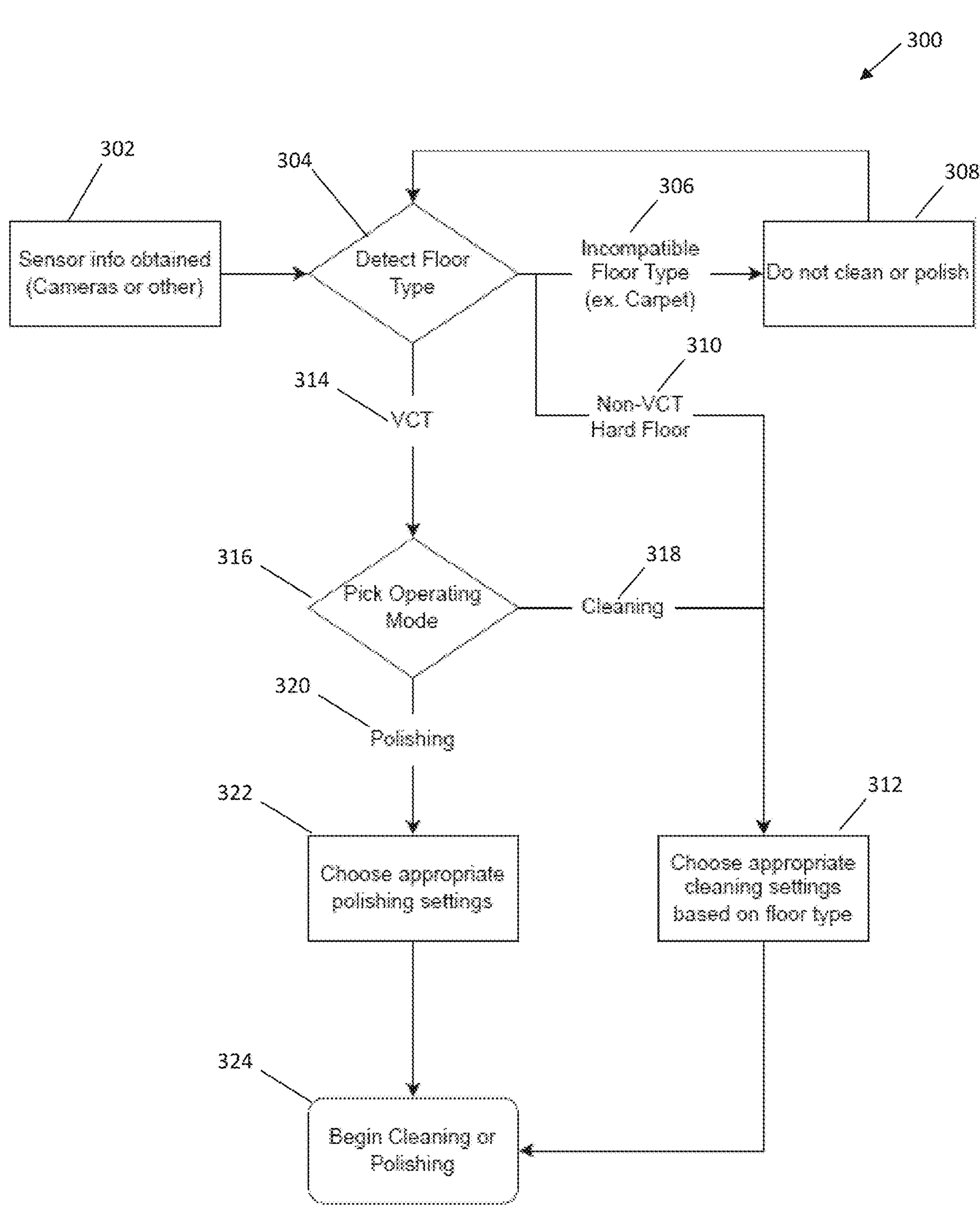
FIG. 7 is a diagram illustrating an exemplary workflow.

FIG. 7 is a diagram illustrating an exemplary workflow. Workflow 300 initiates with sensor information obtained at step 302. The sensor information can be from front sensing module 114 or rear sensing module 128 and may comprise images or other data streams. Front sensing module 114 may include a shininess detection sensor.

According to FIG. 7, the floor type is detected at step 302. If the floor type is an incompatible floor type (e.g., carpet) at step 306, the system does not clean or polish at step 308.

According to FIG. 7, if the floor type is a non-vinyl composite tile (VCT) hard floor at step 310, the system progresses to choose the appropriate cleaning settings based on the floor type at step 312 and concludes with initiating cleaning or polishing at step 324. According to the disclosure, the non-VCT hard floor at step 310 may include any hard flooring types including hardwood, tiles, concrete, marble and/or other known hard flooring material.

According to FIG. 7, if the floor type is a vinyl composite tile (VCT) at step 314, the operating mode is selected at step 316. If the mode is cleaning at step 318, the appropriate cleaning settings based on the floor type are chosen at step 312 and the workflow concludes by initiating cleaning or polishing at step 324.

According to FIG. 7, if the operating mode at step 316 is polishing at step 320, the workflow chooses the appropriate polishing settings. The workflow concludes by initiating cleaning or polishing at step 324.

Figure 8:
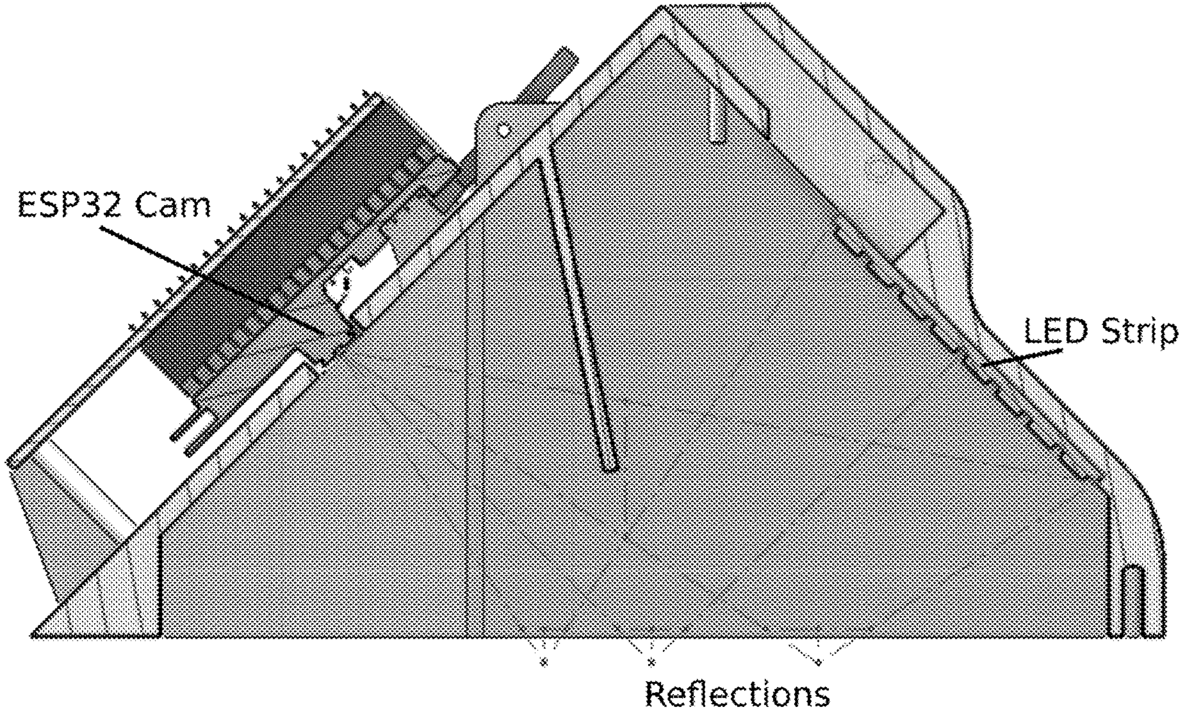
FIG. 8 is a diagram illustrating detection of floor shininess.

FIG. 8 is a diagram illustrating detection of floor shininess. According to FIG. 8, a camera and a light source (e.g., LED lights) on a cleaning apparatus are shown to detect floor shininess. The camera and LED light shone down at the floor and is configured to detect in real-time the gloss and/or shininess of the floor. According to FIG. 8, the camera can be an ESP32 camera module and the light source can be a LED strip of lights. Reflections of the LED strip on the floor surface is configured to be detected bye the ESP32 camera module.

Test Results

According to the disclosure, one of the objectives of this disclosure was to measure floor shininess in a cost-effective manner using a floor cleaning system that adapts the cleaning parameters to optimize cleaning performance in the specific context of operation. A further objective is for the floor cleaning system to polish the floor. Machine learning algorithms can be used to enable these tasks.

According to the disclosure, the floor cleaning or polishing process is to run a machine learning algorithm onboard the semi-autonomous cleaning device 100 (i.e., ESP32Cam). A low cost gloss meter can be used by placing it under the cleaning device at floor level. In order to enable the machine learning algorithm, the first step is training an algorithm offline with a more powerful machine (i.e., computer or cloud computer).

Data Collection and Data Processing

According to the disclosure, four images of the floor with different lighting conditions were taken, along with Rhopoint glossmeter measurement data for each data point. According to the disclosure, multiple data points were collected with the data collection rig. To train an algorithm the data was split with 90% for training and 10% reserved for validation.

Figure 9:
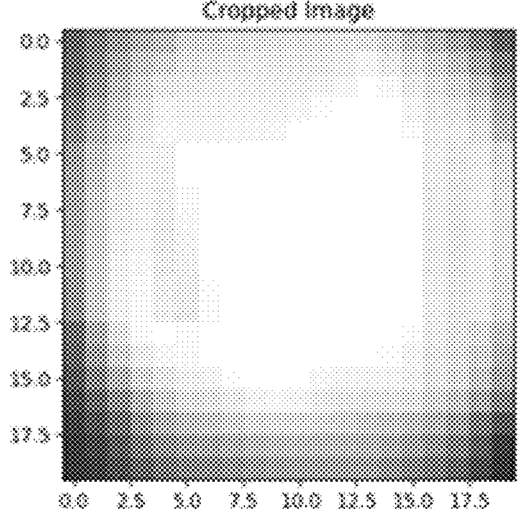
FIG. 9 is a diagram of the cropped image.

According to the disclosure, a 20×20 image containing the reflection of a single RGB LED was used for testing. FIG. 9 is a diagram of the image cropped to reduce processing time. No post-processing was performed as RAW image sensor data was not used.

Training Algorithms

According to the disclosure, Random Forest was an exemplary machine learning algorithm used for this application, though K nearest neighbours, linear regression and a neural network may also be used. In further embodiments, these and other machine learning algorithms may be considered for use.

Image Processing

According to the disclosure, once machine learning algorithms were trained the goal was to move the algorithms over to the ESP32Cam and perform all processing and prediction onboard. The ESP32Cam takes an image and stores it in a compressed jpg format. However, for training and predicting with a machine learning algorithm, an uncompressed image is needed. In Python this is easily achievable using CV2. On the ESP32 a function is available to convert the compressed image into an RGB array. The image is then subsequently cropped.

Regression

According to the disclosure, the library MicroMLGen was chosen due to its ability to port both Decision Trees and Random Forest to a C++ header file capable of being run on the ESP32Cam. On other implementations, other libraries and models can be used.

The ESP32Cam takes about 700 ms to turn on the LED, capture an image, process the image and make a prediction. This is more than 5 times faster than the Rhopoint glossmeter measurement collected.

Classification and Results

In one embodiment, a random forest classification model was trained. To generate labels the measured gloss for the training dataset was rounded to the nearest 2.5 GU and converted to a string. As a result, the trained algorithm may predict to the nearest 2.5 GU and may estimate within the range of gloss values in the training set (20-82.5 GU).

Figure 10:
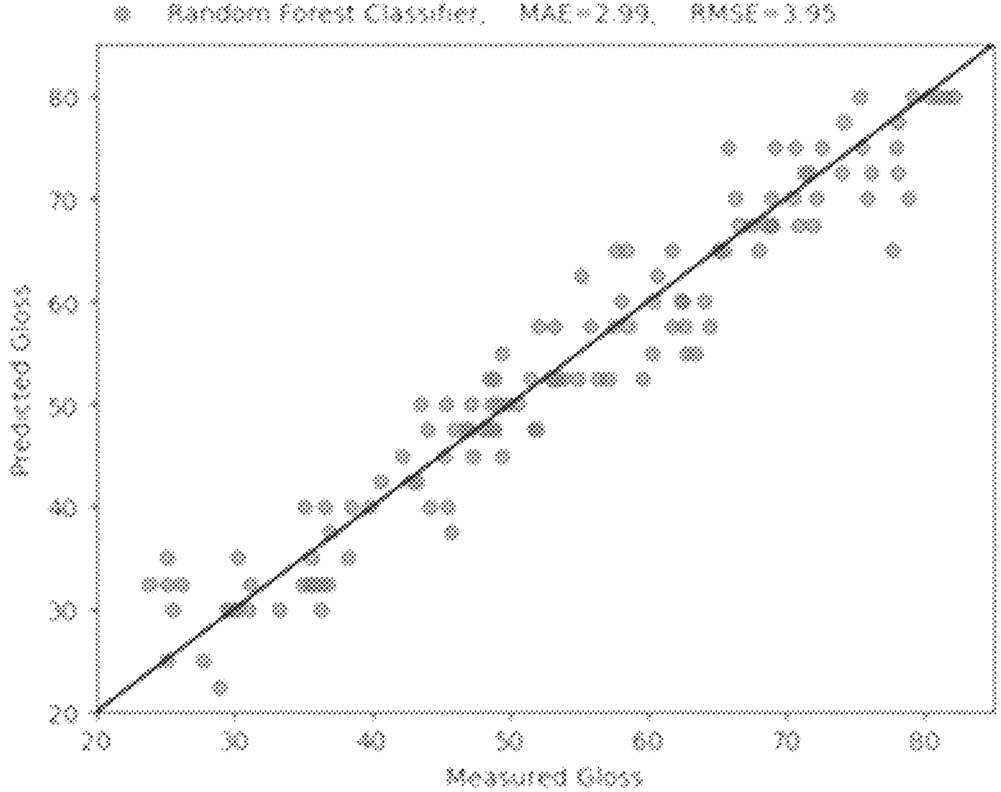
FIG. 10 is a plot comparing the gloss values predicted by the random forest classifier to the gloss values measured with the Rhopoint.

The end result, in this embodiment, is a classification algorithm trained with 35 estimators. FIG. 10 is a plot comparing the gloss values predicted by the random forest classifier to the gloss values measured with the Rhopoint glossmeter.

According to the disclosure, rather than distinguishing between broad classes of floor materials (e.g., carpet vs. hard floor) and employing an entirely different cleaning method, the proposed solution distinguishes between the floor types that are traditionally cleaned using the same method (e.g., ceramic tile and Vinyl Composite Tile (VCT)), with fine-tuning of the cleaning system parameters to optimize performance.

In further embodiments, automated optimization can be completed by a floor-type-detection machine learning (ML) algorithm. In further embodiments these ML algorithms can also be extended to perform floor cleanliness and floor shininess detection. In further embodiments, the shininess of the floors can be detected and shininess maps can be built in real-time.

In further embodiments, the customer could set the cleaning plan, the cleaning device detects the plan automatically and the human (or operator of cleaning device) selects the plans from the graphical user interface (GUI) of the device. In further embodiments, the plan can be selected remotely.

In further embodiments, the cleaning device can measure the floor cleanliness and/or shininess behind itself and decide to go back and clean an area again with optimized or more aggressive cleaning settings. In further embodiments, the cleaning device can also create a map of the shininess/cleanliness and recommend cleaning routes to the customer (i.e., decide how it will clean the facility by itself or execute an automated cleaning plan).

According to the disclosure, a computer-implemented method for floor cleaning operations with adjustable cleaning parameters of a semi-autonomous cleaning apparatus is disclosed. The method comprises the steps of receiving data from one or more sensors of the cleaning apparatus, detecting a floor type. If the floor type is an incompatible floor type, stopping operation of the cleaning apparatus. If the floor type is a non-Vinyl Composite Tile (VCT) floor type, select an appropriate cleaning setting based on the floor type.

According to the method of the disclosure, if the floor type is a Vinyl Composite Tile (VCT) floor type, select an operating mode. If the selected operating mode is cleaning, electing cleaning operating mode and select the appropriate cleaning settings. If the selected operating mode is polishing, select the appropriate polishing settings, provide instructions to the cleaning apparatus to initiate cleaning or polishing and send instructions to a cleaning assembly module of the cleaning apparatus to execute the instructions.

According to the disclosure, the sensor of the method is a front sensing module or a rear sensing module. The front sensing module or the rear sensing module of the method further comprises one or more cameras. The front sensing module of the method is mounted on front of the apparatus at an angle adapted to capture sensing data of the floor and oriented to take images of the floor.

According to the disclosure, the incompatible floor type of the method includes carpet, astro-turf or grass. The stop operation of the method further comprises stopping movement of the cleaning apparatus and not executing the cleaning or polishing plan. The cleaning assembly module of the method further comprising swappable or replaceable cleaning pads.

According to the disclosure, a semi-autonomous cleaning apparatus configured for adjustable floor cleaning operations comprises a frame, a processor, one or more sensing module having at least one sensor, a cleaning assembly configured for floor cleaning operations. The apparatus is configured for selecting adjustable cleaning parameters for the floor cleaning operations by receiving data from one or more sensors of the cleaning apparatus, detecting a floor type.

According to the disclosure, if the floor type is a non-Vinyl Composite Tile (VCT) floor type, the apparatus selects an appropriate cleaning setting based on the floor type. If the floor type is a Vinyl Composite Tile (VCT) floor type, the apparatus selects an operating mode. if the selected operating mode is cleaning, the apparatus selects the cleaning operating mode and selects the appropriate cleaning settings.

According to the disclosure, if the selected operating mode is polishing, the apparatus selects the appropriate polishing settings. The apparatus also provides instructions to the cleaning apparatus to initiate cleaning or polishing and sends instructions to a cleaning assembly module of the cleaning apparatus to execute the instructions.

According to the disclosure, if the floor type of the apparatus is an incompatible floor type, the apparatus is further configured to stop operation of the cleaning apparatus. The one or more sensing module of the apparatus is a front sensing module or a rear sensing module. The front sensing module or the rear sensing module of the apparatus further comprises one or more cameras.

According to the disclosure, the front sensing module is mounted on front of the apparatus at an angle adapted to capture sensing data of the floor and oriented to take images of the floor. The incompatible floor type of the apparatus includes carpet, astro-turf or grass.

According to the disclosure, the stop operation of the apparatus further comprises stopping movement of the cleaning apparatus and not executing the cleaning or polishing plan. The cleaning assembly module of the apparatus further comprises swappable or replaceable cleaning pads.

The functions described herein may be stored as one or more instructions on a processor-readable or computer-readable medium. The term "computer-readable medium" refers to any medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can store program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-built for model training and/or model inference.

The disclosed or illustrated tasks can be distributed across multiple processors or computing devices of a computer system, including computing devices that are geographically distributed.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed:

1. A semi-autonomous cleaning apparatus configured for adjustable floor cleaning operations, comprising:

- a frame;
- a processor;
- a front sensing module and a rear sensing module, each sensing module including at least one sensor;
- a cleaning assembly configured for floor cleaning operations; and
- a light source mounted to emit light toward a floor surface and a camera oriented to capture an image of a reflection of the light source from the floor surface;
- wherein the processor is configured to:
  - receive sensor data from at least one of the front sensing module or the rear sensing module;
  - detect a floor type based on the sensor data;
  - when the floor type is an incompatible floor type, stop operation of the cleaning apparatus;
  - when the floor type is a non-Vinyl Composite Tile (VCT) floor type, select an appropriate cleaning setting based on the detected floor type;
  - when the floor type is a VCT floor type, select an operating mode comprising at least a cleaning mode and a polishing mode;
  - when the operating mode is the polishing mode, determine a shininess value for the floor surface by processing the captured image of the reflection of the light source, and select a polishing setting based at least on the shininess value;
  - provide instructions to the cleaning apparatus to initiate cleaning or polishing; and
  - send instructions to a cleaning assembly module of the cleaning apparatus to execute the instructions.

2. The apparatus of claim 1, wherein stopping operation comprises stopping movement of the cleaning apparatus and not executing a cleaning plan or a polishing plan.

3. The apparatus of claim 1, wherein at least one sensor of at least one of the front sensing module or the rear sensing module comprises a camera.

4. The apparatus of claim 3, wherein the camera comprises an ESP32 camera module and the light source comprises an LED strip.

5. The apparatus of claim 3, wherein the front sensing module is mounted on a front of the apparatus at an angle adapted to capture sensing data of the floor and oriented to take images of the floor.

6. The apparatus of claim 1, wherein the incompatible floor type includes carpet, astro-turf or grass.

7. The apparatus of claim 1, wherein selecting the polishing setting comprises executing, on the processor, a machine learning model trained to predict a gloss value from the captured image.

8. The apparatus of claim 1, wherein the cleaning assembly comprises swappable or replaceable cleaning pads.

* * * * *